Feb. 13, 1934.    B. W. FREEMAN    1,947,387
CUT-OUT MACHINE
Filed Jan. 18, 1932    3 Sheets-Sheet 1
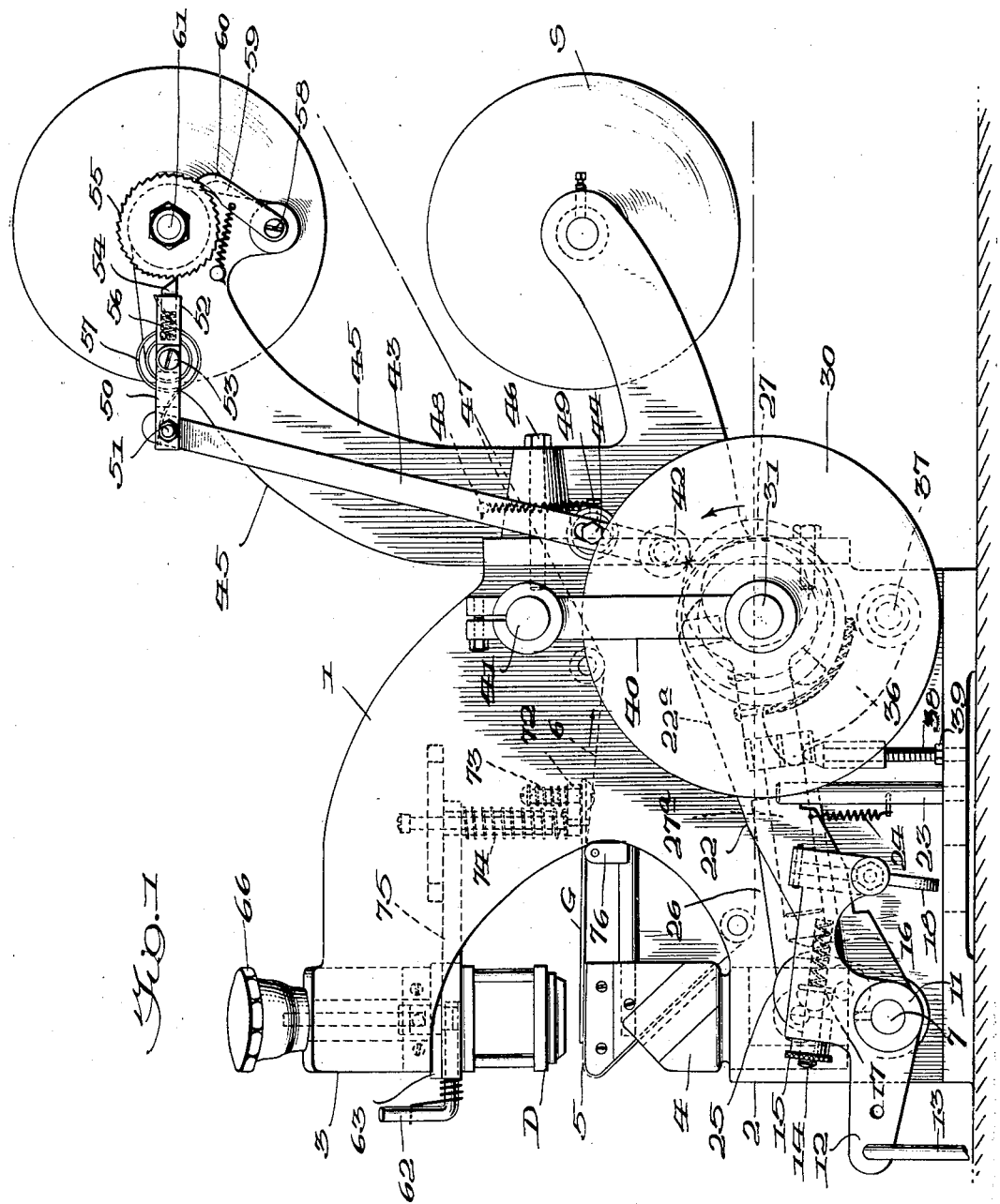
Inventor
Benjamin W. Freeman,
By Riordon & Riordon
Attorney

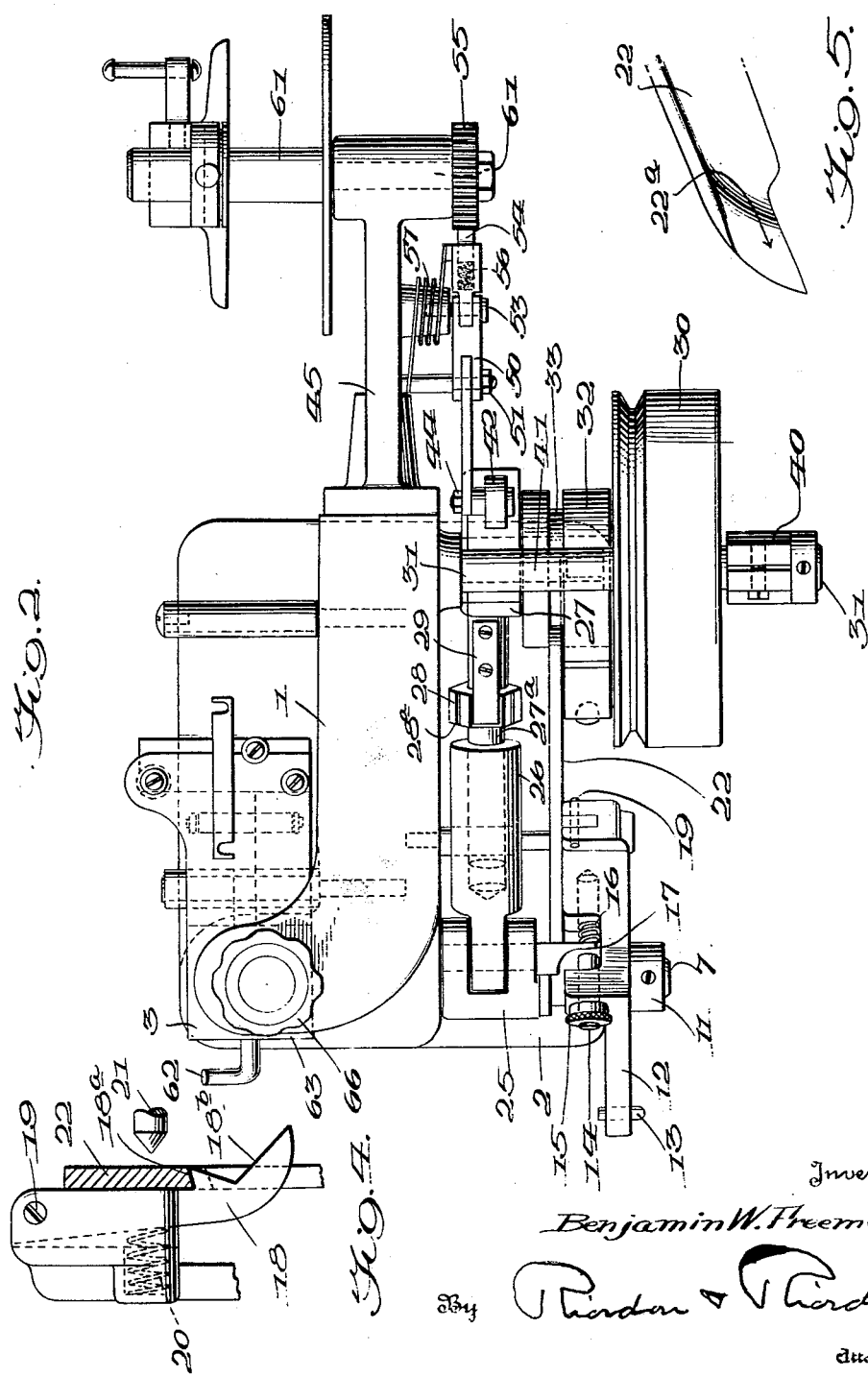

Feb. 13, 1934.  B. W. FREEMAN  1,947,387
CUT-OUT MACHINE
Filed Jan. 18, 1932   3 Sheets-Sheet 3
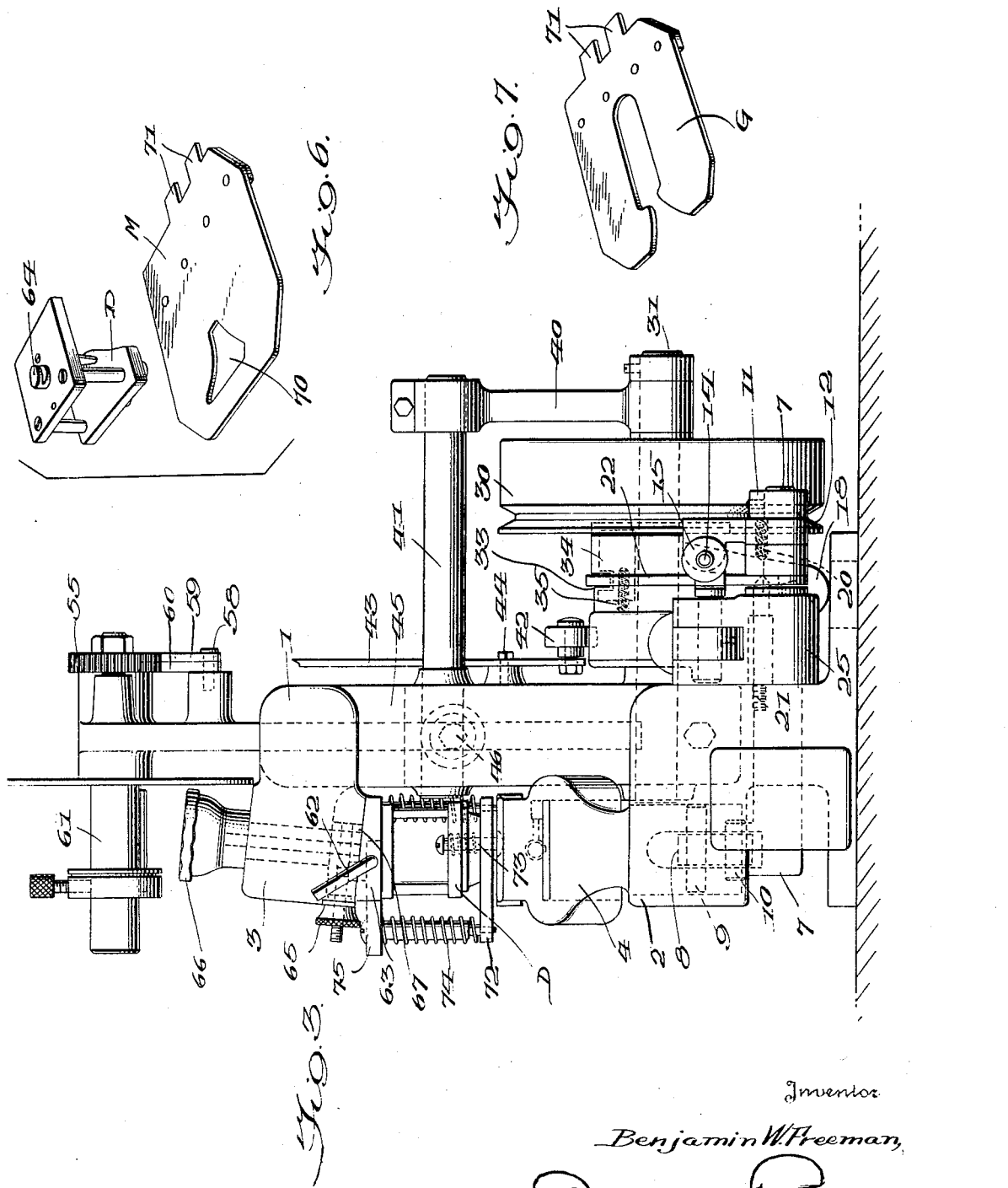
Inventor
Benjamin W. Freeman,
By Riordan & Riordan
Attorney Patented Feb. 13, 1934

1,947,387

UNITED STATES PATENT OFFICE 1,947,387

CUT-OUT MACHINE

Benjamin W. Freeman, Cincinnati, Ohio

Application January 18, 1932. Serial No. 587,431

29 Claims. (Cl. 164—25)

The present invention relates to machines for use in the manufacture of boots and shoes, and particularly for forming the open work or cutout sections in shoe uppers, as well as for use in perforating, ornamentation or the like in connection with cutout machines. More specifically the machine forming the subject matter of this invention is of the general type disclosed and described in my Patent No. 1,681,033 of August 14th, 1928, but in many respects an improvement thereupon.

The machine of that patent is a type intended for use as a "universal" cutting out press particularly intended for work on shoes, leather and shoe materials and where the work is of a widely varying contour and design, the machine being adapted to operate not only upon flat material but to perform cutting out operations on other than flat work, such as closed and fitted uppers and the like.

To this end there is provided in that machine, a die and a work support which are movable through a horizontal plane into and out of an operating position beneath a vertically reciprocating plunger, which, upon contacting the work placed over the die causes a piercing or cutting out of the work through the relative movement of the plunger and die. To ensure accurate positioning of the work with respect to the die, a suitable gauge cooperable with a predetermined characteristic of the work is provided.

The machine of the present invention differs from that of the patent in several respects, first, instead of locating the die on a movable support with the cutting edges of the die facing upward, the die is located in a position to operate upon the work from above and its cutting edges face downwardly. The die does not move during the cycle of operations, but the work support is arranged to move up and down, through a two phase reciprocating movement, and in the first phase, which is effected entirely by a manual operation, brings the work up into contact with the die or with an aligning gauge adjacent the die. Instead of using a plunger forcing the work down upon the cutting edges of the die, the work support itself usurps the functions of the plunger during the second phase of the movement in which the final operation upon the work is effected through a blow delivered by the power means, thus eliminating one set of mechanisms.

One object of the present invention then is to provide an improved machine adapted to the formation of cutouts in shoe parts, for perforating work of various kinds and for ornamenting the work by producing ornamental outlines, demarkations and cutouts thereon.

Another object is to provide a machine for the purpose mentioned having improved mechanisms for supporting work of different kinds and shapes and for providing relative movement between such work support and cutting devices.

Still another object is to provide improved means for effectively controlling operations of the machine and for ensuring a definite cycle of operations in such a manner as to offer the greatest safety to an operator, and to prevent spoiling of the work. It is contemplated that the present machine will include means for accurately positioning and aligning work to be ornamented; to provide a stationary die, i. e., a die which moves neither in and out, nor up and down, but which is stationary during the entire cycle of operations, but which may be adjusted to effect a proper location thereof; and to provide a movable work support, cooperable with the die, and which functions as, and supplants the power actuated plunger customarily used for effecting cutting out operations.

In machines of this nature as heretofore used it has been customary to provide a plurality of treadles or other operator-controlled elements by means of which several steps in the cycle, such as moving the die or work support, gauging and aligning the work, cutting out the work, and removing the completed work from the machine, may be independently initiated. An aim of the present invention is to provide a single control, as a treadle, by means of which the work support may be raised, the main operating clutch of the machine released to effect an ornamenting operation, and the work thereafter moved to a position from which it may be removed from the machine.

To the attainment of the above and other objects, reference may be made to the attached drawings, in which:—

Fig. 1 is a side elevation of the machine;

Fig. 2 is a plan view thereof;

Fig. 3 is a front elevation;

Fig. 4 is a fragmentary detail, partly in section, of the clutch release mechanism;

Fig. 5 is a fragmentary detail perspective thereof;

Fig. 6 is a perspective of a gauge mask, for use with some types of work, showing its relation to the die; and Fig. 7 is a perspective of an abutment gauge, for use with other types of work.

Referring more particularly to the drawings, in which like reference numerals designate like parts, it will be observed that the machine comprises generally a C-shaped frame 1, the lower portion of which forms a bed 2, and the upper portion of which forms a head 3, extending over the bed and in alignment therewith. Mounted on the base or bed 2, and in the space between the base and the head portion 3 is an anvil like work support 4. The top face of the anvil is provided with a plate 5 of brass or other relatively soft metal, and above this brass plate passes a strip of backing paper 6, for the die, moving from a supply roll S to a rewinding spindle 61, hereinafter described in detail.

A die D is mounted in the head portion 3, above the work support, and when a relative movement takes place between the die and support, to ornament the work, the cutting edges of the die will penetrate the work, into the backing paper, which insures a clean cut. The brass plate, being softer than the edges of the die, protects the edges against undue wear and breakage.

The work support 4 is mounted in the base 2 for substantially vertical reciprocation, and in order to produce this movement an offset shaft 7 is connected thereto by means of a link 8 and a pin 9. The link 8 is connected to the shaft 7 by means of a pin 10 set in the offset portion thereof.

The shank of the anvil 4 is rounded to fit in a correspondingly shaped hole in the base 2 and, as shown in Fig. 3, is formed with a milled out portion shaped to fit the link 8, thus preventing the anvil from turning while moving upwardly and downwardly. The pin 9 also has the effect of preventing any movement of the anvil other than up and down.

The shaft 7 is mounted in the bed for oscillatable movement. Attached to one end thereof is a collar 11, adjacent a treadle lever 12, which lever is mounted for free rotation on the shaft 7 and is connected to a treadle (not shown) by means of the treadle rod 13. Mounted in the treadle lever 12 is a headless set screw 14 which may be locked in various adjusted positions by the lock nut 15. Opposing the screw 14 is a pocket in the treadle lever in which is positioned a spring 16, (Fig. 1). Interposed between the spring 16 and screw 14, is a stud or pin 17.

When the treadle rod 13 is lowered, by depression of the treadle the spring 16 will push against the stud or pin 17, this arrangement providing an adjustment, by means of screw 14, for the relative upward movement of the anvil.

Also mounted on the clutch or treadle lever 12 is a clutch hook 18 which swings on a stud 19 and is normally held away from the treadle lever 12 by means of the spring 20. The spring 20 acts to force the hook 18 against a threaded pin 21 mounted in the bed 2.

A clutch release lever 22 is freely mounted on the shaft 7 and held downwardly against the stop post 23 (Fig. 1) by means of a spring 24.

The hook 18 has a notch indicated at 18a which contacts with the clutch release lever 22 when the lever 22 is raised. The pin 21 is provided with a cone shaped end adjacent the hook 18 for adjustment purposes. By adjusting the pin in and out the timing of release of the clutch, relative to the movement of the hook 18 or treadle lever 12, can be controlled.

Keyed on the shaft 7 is a lever 25 connected to a sleeve 26 by means of the stud or pin 17 (Fig. 2). The sleeve 26 is hollow to permit reciprocation therein of the spindle portion 27a of an eccentric strap 27. It will thus be seen that by moving the treadle the anvil 4 is raised and lowered, while the sleeve 26 moves freely on the spindle portion 27a of the eccentric strap 27. The spindle portion 27a is partly threaded to accommodate an adjusting nut 28 which is recessed on its outside faces as indicated at 28a to receive a spring pressed lock 29 for maintaining the nut in its adjusted position. It will be observed that adjustment of the pin 21, together with adjustments of the screw 14 make it possible to move the anvil 4 upwardly to variably adjusted positions prior to release of the clutch.

A continuously rotating driving pulley 30 is effective to supply power from any convenient source to the machine, this pulley being carried by a shaft 31 which is mounted for rotation in frame 1 of the machine. Keyed to the shaft is the hub 32 of a single revolution clutch, which hub is recessed at 33 to receive the clutch release lever 22. The clutch hub 32 also forms an eccentric on which is mounted the eccentric strap 27. It will thus be obvious that when the clutch hub is rotated through connection to the driving pulley 30 that the eccentric strap will be caused to reciprocate. To connect the hub 32 with the driving pulley is a key 34. This key is normally pressed toward the pulley by the spring 35, and when the lever 22 is raised the key 34 engages lugs (not shown) in the pulley 30, thus connecting the pulley 30 to the clutch hub 32.

The hook 18 has an angled end indicated at 18b (Fig. 4) which contacts with the tapered end of the stud 21 and when forced away from the stud 21 causes the portion 18a to disengage from the lever 22 so that the lever is immediately drawn downward by the spring 24. This takes place before the clutch hub 32 has made a complete revolution. The lever 22 in its downward position engages the clutch dog or key 34 thereby to withdraw same from the driving pulley 30. The end of the lever 22 is tapered, as indicated at 22a (Fig. 5) and as the clutch key 34 revolves it comes in contact with the portion 22a, and is moved thereby. To facilitate this movement, the contacting surface of the key is made tapering.

The clutch hub 32 on the portion adjoining the driving pulley is also eccentrically formed and this eccentricity is so designed that at the time the machine comes to rest, the eccentric portion strikes the brake 36, (Fig. 1) which brake is provided with a leather face, and swings on a pin 37. An adjusting screw 38 is provided for the brake and formed with a threaded end to accommodate a nut 39 by means of which it may be raised or lowered and held in adjusted position in the frame 1.

The driving shaft 31 besides being supported at one end by a bearing in the frame 1 is mounted at its other end in a bearing on the lever 40, which lever in turn is connected to the frame by means of a spindle 41.

The eccentric strap 27, when moving, strikes a roll 42 mounted on a lever 43 which is supported for movement by a stud 44 extending through a slot in the lever, the stud 44 being attached to the paper holding arm 45.

The paper holder arm 45 is part of a bracket attached to the frame 1 by means of screws 46. The lever 43 is held downwardly by means of the spring 47 which is attached to the lever at 48 and to the bracket at 49. The upper end of the lever 43 is connected to another lever 50 by means of a stud or pivot 51. The lever 50 is connected to the lever 52 by means of a pivot stud 53. The levers 50 and 52 are provided with connecting abutments, (Fig. 1) so arranged that the levers can rotate upwardly about the stud 53, but will abut when their lower edges form a straight line, and cannot rotate downwardly beyond this position. The lever 52 has a pawl 54 mounted on its end, and normally positioned adjacent a ratchet wheel 55 by means of a spring 56. A spring 57 is provided to hold the two levers 50 and 52 normally in the position shown in Fig. 1.

The machine is shown at rest in Fig. 1 and when the clutch is released the eccentric strap 27 will rotate in the direction shown by the arrow. The point of contact between the roll 42, and the eccentric strap is the high spot of their connection, as shown at X in Fig. 1. As a result, immediately upon movement of the eccentric strap the spring 47 pulls the lever 43 down and causes the links 50 and 52 to rotate together about the stud 53 with the pawl 54 moving upwardly several notches on the ratchet wheel 55. As the eccentric strap approaches its original position it raises the rod 43, exerting a winding moment on the spring 57 and applying a downward thrust to the lever 52. The work support is moving through its portion of the cycle as these operations are taking place, to ornament the work.

As the die D is released from the backing paper 6 and the work, pawl 54 forces the ratchet wheel down and this winds up a predetermined amount of paper, this winding taking place after the die D is released.

One advantage of the spiral connection 50—52 is the prevention of rewinding of the paper while the die is striking the paper, and thus preventing any tearing of the paper.

There are two pawls attached to the bracket 45 by means of the stud 58, these pawls being designated 59 and 60. The purpose of the pawls 59 and 60 is to guarantee rotation of the rewinding spindle 61, in one direction only, viz., to wind up the paper.

The die D is held in the head 3 by means of a locking lever 62, engageable with a notched member 64 on the die block or base, the lever being mounted in a holder 63, the rear end of which also supports the mechanism for attaching a gauging device hereinafter described.

The holder 63 has an inclined upper surface indicated generally at 67 (Fig. 3), where it is attached to the head 3 and an adjusting nut 65 projecting from above this inclined surface is effective to raise or lower the die. The surface of the head opposed to the holder 63 is also inclined for the purpose of causing a movement of the holder 63 which in turn moves the die sidewise of the machine. This holder 63 being a support for the gauge hereinafter described, is thus effective to cause a movement of the gauge with the die. A hand wheel 66 is provided for locking the holder 63 in its adjusted position.

In order to accurately position the work on its support, with reference to the cutting edges of the die, there is provided a gauge mask M (Fig. 6) having a cut out portion 70 of a shape conforming to a predetermined characteristic of the work. This mask may be attached by lugs 71 to a block 72 in the machine, by means of a spring clamp 73 (Fig. 1). The block 72 is resiliently supported by studs 74, slidingly mounted in an extension 75 of the holder 63. With some types of work, it is preferable to use an abutment or edge gauge G, rather than a mask M. Such a gauge is in all respects similar to the mask except that the gauging is done from an abutment edge formed by shaping the gauge, rather than by an internal edge of a cutout.

As shown in Fig. 1, the gauge or mask projects between the support for the die D and the support 4, over the backing paper 5. Through a bracket connection 76, the mask or gauge is caused to move with the anvil 4 during a portion of the cycle of operations.

From the foregoing description, the operation and use of the machine will be readily understood. The die is adjusted to the proper position for the work, the anvil or work support is properly adjusted, and the mask M or the abutment gauge G, if either is used, properly positioned in the machine. With the work support 4 in its lowermost position, the work is placed thereon, over the paper strip 6. The treadle rod 13 is partially depressed and the anvil 4, through its connection is thus brought into a partially raised position where the work will be immediately adjacent the under side of the mask or die, or against the gauge, depending upon the method of aligning the work. By reference to the mask, die or gauge the work may then be accurately aligned, the edges of the cutout portion 70 of the mask, or the cutting edges of the die being made to coincide with some predetermined characteristic of the work, or in the event that the gauge G is used, the work is placed in abutting relation to the edges of the shaped portion. Obviously the mask may be suitably shaped to accord with the work in hand, and similarly, any die, suitable to the work, may be utilized.

During these preliminary steps in the cycle of operations the clutch key 34 is disengaged from the pulley 30 and there is no possibility of danger to the operator, nor of premature completion of the cycle of operations. The clutch key will not be moved into engagement with the driving pulley until released by the clutch lever 22, after the anvil 4 has reached a predetermined position on its upward movement; and the key will be disengaged, from the driving pulley 30, by lever 22, and after a single revolution of the clutch.

As soon as the work is properly positioned, further depression of the treadle rod 13 will cause the engagement of the clutch key 34 with lugs in the pulley 30, thereby connecting the anvil operating mechanism to the power driven pulley, whereupon a forceful movement of the anvil 4 is produced to bring the work up against the die to effect the cutting out by the die, the anvil thereafter returning to its original position. The mask or gauge will, if either is used, be moved upwardly through the connection 76, this movement being permitted by the resilient mounting of the gauge and will be returned with the anvil as soon as the cutting or ornamenting operation is complete.

It will be evident, that the gauge and work support partake of no movement other than toward and from the die. That is, they do not move laterally, with respect to the die, during normal operation of the machine, and hence, when the work is once gauged and aligned, there is no possibility of its shifting during completion of the ornamenting operation.

If desired, and as is usually the case, when using the edge gauge G, the several parts may be adjusted to permit proper placement of the work on the support, in a lowered position, and thus a single, continuous movement will suffice to ornament the work.

Having thus described my invention, what I claim as new and desire to secure by Letters Patent of the United States, is:—

1. An ornamenting machine for operating on shoe upper materials comprising a movable work support, an ornamenting die, means to attach said die fixedly in the machine, means to move said support toward said die to a position where the work may be aligned with respect to the die, means interposed between said die and support, to engage and hold the work on said support, and means for moving said support further toward the die, whereby to effect an ornamentation of the work.

2. An ornamenting machine for operating on shoe upper materials comprising a movable work support, a combined die and gauge unit, means to attach said unit fixedly in the machine, means to move said support relative to the gauge and toward said unit to a position where the work may, through cooperation with the gauge, be aligned with respect to the die, and means for moving said support further toward the die, whereby to effect an ornamentation of the work.

3. An ornamenting machine for operating on shoe upper materials comprising a movable work support, an ornamenting die, a work aligning gauge carried thereby, means to attach said die fixedly in the machine, means to move said support toward said die to a position where the work may be aligned with respect to the die, and means for moving said support further toward the die, whereby to effect an ornamentation of the work, and a single operator controlled member effective to actuate said first support moving means and to initiate actuation of said second support moving means.

4. An ornamenting machine for operating on shoe upper materials comprising a movable work support, a combined die and gauge unit, means to attach said unit fixedly in the machine, means to move said support relative to the gauge and toward said unit to a position where the work may, through cooperation with the gauge, be aligned with respect to the die, and means for moving said support further toward the die, whereby to effect an ornamentation of the work, and a single operator controlled member effective to actuate said first support moving means and to initiate actuation of said second support moving means.

5. An ornamenting machine for operating on shoe upper materials comprising a movable work support, an ornamenting die, a work aligning gauge carried thereby, means to attach said die fixedly in the machine, manual means to move said support toward said die to a position where the work may be aligned with respect to the die, power actuated means for moving said support further toward the die whereby to effect an ornamentation of the work, and means to move said gauge with said support, through a portion of the cycle of operation.

6. An ornamenting machine for operating on shoe upper materials comprising a movable work support, a combined die and gauge unit, means to attach said unit fixedly in the machine, manual means to move said support toward said unit to a position where the work may, through cooperation with the gauge, be aligned with respect to the die, and power actuated means for moving said support further toward the die whereby to effect an ornamentation of the work.

7. An ornamenting machine for operating on shoe upper materials comprising a movable work support, an ornamenting die, a work aligning gauge carried thereby, means to attach said die fixedly in the machine, manual means to move said support toward said die to a position where the work may be aligned with respect to the die, power actuated means for moving said support further toward the die whereby to effect an ornamentation of the work, means to synchronize said power means with said manual means whereby said power means become operative only after the support reaches a predetermined position, and means to move said gauge with said support, through a portion of the cycle of operation.

8. An ornamenting machine for operating on shoe upper materials comprising a movable work support, a combined die and gauge unit, means to attach said unit fixedly in the machine, manual means to move said support relative to the gauge and toward said unit to a position where the work may, through cooperation with the gauge be aligned with respect to the die, and power actuated means for moving said support further toward the die whereby to effect an ornamentation of the work, and means to synchronize said power means with said manual means whereby said power means become operative only after the support reaches a predetermined position.

9. An ornamenting machine for operating on shoe upper materials comprising a movable work support, an ornamenting die, a work aligning gauge carried thereby, means to attach said die fixedly in the machine, manual means to move said support toward said die to a position where the work may be aligned with respect to the die, power actuated means for moving said support further toward the die whereby to effect an ornamentation of the work, means to synchronize said power means with said manual means whereby said power means become operative only after the support reaches a predetermined position, means to predetermine the position at which the power means becomes operative, and means to move said gauge with said support, through a portion of the cycle of operation.

10. An ornamenting machine for operating on shoe upper materials comprising a movable work support, a combined die and gauge unit, means to attach said unit fixedly in the machine, manual means to move said support relative to the gauge and toward said unit to a position where the work may, through cooperation with the gauge be aligned with respect to the die, and power actuated means for moving said support further toward the die whereby to effect an ornamentation of the work, means to synchronize said power means with said manual means whereby said power means become operative only after the support reaches a predetermined position, and means to predetermine the position at which the power means becomes operative.

11. An ornamenting machine for operating on shoe upper materials, comprising a vertically reciprocable work support, a combined die and gauge unit mounted in the machine substantially in vertical alignment with said support, the gauging portion of said unit extending between the die portion and said support, manual means to move said support upwardly toward said die to a position where the work may, through cooperation with the gauge portion, be aligned with respect to the die, and power actuated means for moving said support further toward the die whereby to effect an ornamentation of the work, said power actuated means being further effective to return said support to its original position after ornamentation of the work, as a continuous operation.

12. An ornamenting machine for operating on shoe upper materials, comprising a fixedly mounted die, a work support movable toward and from said die, a work aligning gauge carried by said die and having a portion interposed between the support and die, a power actuated mechanism including a driven shaft, a source of power, and a clutch effective to connect said shaft to said source of power; manual means to move said support toward said die to a predetermined position relative to the die, means automatically actuatable when the support reaches such predetermined position to operate the clutch and thereby actuate the shaft, and means connecting said shaft to said support whereby movement of the shaft will produce a further movement of the support toward the die.

13. An ornamenting machine for operating on shoe upper materials, comprising a fixedly mounted die, a work support movable toward and from said die, a work aligning gauge carried by said die and having a portion interposed between the support and die, a power actuated mechanism including a driven shaft, a source of power, and a clutch effective to connect said shaft to said source of power; manual means to move said support toward said die to a predetermined position relative to the die, means automatically actuatable when the support reaches such predetermined position to operate the clutch and thereby actuate the shaft, means connecting said shaft to said support whereby movement of the shaft will produce a further movement of the support toward the die, and adjusting means to predetermine the position of the support at which the clutch is actuated.

14. A machine for operating on shoe upper materials comprising a fixed die, a work support movable toward and from said die, a work aligning gauge carried by said die and having a portion interposed between the support and die, a power actuated mechanism, including a single revolution clutch effective to connect the mechanism to a source of power, means to move said support toward said die, means automatically actuatable when said support reaches a predetermined position in its path of movement toward the die, to actuate said clutch, and means connecting said power mechanism to said die whereby said power actuated mechanism will further move the support towards the die upon actuation of the clutch, and adjusting means to predetermine the position at which the clutch is actuated.

15. A machine for operating on shoe upper materials comprising a fixed die, a work support movable toward and from said die, a power actuated mechanism, including a single revolution clutch effective to connect the mechanism to a source of power, means to move said support toward said die, means automatically actuatable when said support reaches a predetermined position in its path of movement toward the die, to actuate said clutch, means connecting said power mechanism to said die whereby said power actuated mechanism will further move the support toward the die upon actuation of the clutch, and a single treadle connected to said die moving means and to said automatically actuatable means, effective to control both means.

16. An ornamenting machine for operating on shoe upper materials comprising a movable work support, a fixed die detachably mounted in the machine, a work aligning gauge carried by said die and having a portion interposed between the support and die, manual means to move said support toward said die to a position where the work may be properly aligned with respect to the die and power actuated means for subsequently moving said support further toward the die whereby to effect an ornamentation of the work, and adjusting means to predetermine the position of the die at which the power means becomes operative.

17. An ornamenting machine for operating on shoe upper materials comprising a fixedly mounted die, a work support movable toward and from said die, a power actuated mechanism including a driven shaft, a source of power and a clutch effective to connect said shaft to said source of power; means to move said support toward said die, means automatically actuatable when the support reaches a predetermined position in its path of movement to operate the clutch and thereby actuate said shaft, and means including a telescopic connection between said shaft and said support to produce a further movement of the support toward the die upon movement of the shafts.

18. An ornamenting machine for operating on shoe upper materials comprising a fixedly mounted die, a work support movable toward and from said die, a power actuated mechanism including a driven shaft, a source of power and a clutch effective to connect said shaft to said source of power; means to move said support toward said die, means automatically actuatable when the support reaches a predetermined position in its path of movement to operate the clutch and thereby actuate said shaft, and means including a sleeve connected to said support and an eccentric strap connected to said shaft and having a portion telescopically mounted in said sleeve to produce a further movement of the support toward the die upon movement of the shaft.

19. An ornamenting machine for operating on shoe upper materials comprising a fixedly mounted die, a work support movable toward and from said die, a power actuated mechanism including a driven shaft, a source of power and a clutch effective to connect said shaft to said source of power, a treadle shaft having an offset portion connected to said work support, a treadle lever mounted on the treadle shaft, a clutch key positioned to make and break connection between said clutch and said driven shaft, a clutch lever mounted on said treadle shaft and extending in proximity to said clutch key, a sleeve keyed to and extending from said treadle shaft, an eccentric strap mounted on said driven shaft and having a spindle mounted in telescopic relation to said sleeve, and means to move said treadle lever thereby to rotate the treadle shaft and produce by means of said offset portion, a movement of the work support toward the die, a further movement of said treadle shaft being effective to actuate said clutch lever and cause said clutch key to connect the clutch to the driven shaft whereby said eccentric strap, spindle portion and sleeve are effective to provide a further movement of the work support toward the die.

20. An ornamenting machine for operating on shoe upper materials comprising a fixedly mounted die, a work support movable toward and from said die, a power actuated mechanism including a driven shaft, a source of power, and a clutch effective to connect said shaft to said source of power, means to move said support toward said die, and means automatically actuatable when the support reaches a predetermined position to operate the clutch and thereby actuate the shaft, comprising a lever movable into engagement with the clutch to actuate same, and a clutch lever hook effective to hold said lever against operation until the support reaches its predetermined position, and means connecting said shaft to said support whereby movement of the shaft upon operation of the clutch will produce a further movement of the support toward the die.

21. An ornamenting machine for operating on shoe upper materials comprising a fixedly mounted die, a work support movable toward and from said die, a power actuated mechanism including a driven shaft, a source of power, and a clutch effective to connect said shaft to said source of power, means to move said support toward said die, and means automatically actuatable when the support reaches a predetermined position to operate the clutch and thereby actuate the shaft, comprising a lever movable into engagement with the clutch to actuate same and a clutch lever hook effective to hold said lever against operation until the support reaches its predetermined position, means to adjust the operative position of said hook and lever thereby to predetermine the position of the support at which the clutch becomes operative, and means connecting said shaft to said support whereby movement of the shaft upon operation of the clutch will produce a further movement of the support toward the die.

22. An ornamenting machine for operating on shoe upper materials comprising a fixed die, and a work support reciprocable toward and from said die, a strip of backing paper movable across said reciprocable support, power actuated means to move said support into engagement with the die, and means operable in one direction only to wind up the paper as the support is reciprocated, and means synchronizing said winding means with said power means whereby the paper will be wound only when the die and support are separated.

23. An ornamenting machine for operating on shoe upper materials comprising a fixed die and a work support reciprocable toward and from said die, a strip of backing paper movable across said reciprocable support, a supply roll for said paper, power actuated means to move said support into engagement with the die, such movement being effective to withdraw the paper from said supply roll, and means comprising a paper receiving spindle, having a pawl and ratchet control, for winding up the paper in one direction only as the support is reciprocated, and means including connections between said power mechanism and said pawl and ratchet control to synchronize the winding means with the power means whereby the paper will be wound only when the die and support are separated.

24. In an ornamenting machine, for operating on shoe upper materials, a combined die and gauge unit comprising a die holder, a die removably attached thereto, a gauge, and means to attach the gauge to said holder comprising a block resiliently mounted on said holder and having a clamping means for the gauge, said gauge attaching means being positioned to present the gauge in aligned relation to the die.

25. In an ornamenting machine for operating on shoe upper materials, a die unit comprising a cutting die, a base for said die, and a die holder for supporting the unit in the machine, means to removably attach the die to the holder comprising a notched member on the die base and a locking lever mounted in the holder and engageable with said notched member, means to mount said holder fixedly in the machine, a work support and means to reciprocate said support relative to said die unit.

26. In an ornamenting machine for operating on shoe upper materials, a combined die and gauge unit comprising a cutting die, a base for said die, and a die holder for supporting the unit in the machine, means to removably attach the die to the holder comprising a notched member on the die base and a locking lever mounted in the holder and engageable with said notched member, a gauge, and means to attach said gauge to said holder, arranged to present the gauge in aligned relation to the die, and means to mount said holder in the machine.

27. In an ornamenting machine for operating on shoe upper materials, a combined die and gauge unit comprising a die holder, a die removably attached thereto, a gauge, means to attach the gauge to said holder comprising a block resiliently mounted on the holder and having a clamping means for the gauge, said means also including a projecting tongue on the gauge engageable with said clamping means and having a portion cooperable with the die, effective to align a work piece with the die, said gauge attaching means being positioned to present the gauge in aligned relation to the die.

28. In an ornamenting machine for operating on shoe upper materials, a combined die and gauge unit comprising a die holder, a die removably attached thereto, a gauge, and means to attach the gauge to said holder comprising a block resiliently mounted on said holder and having a clamping means for the gauge, said gauge attaching means being positioned to present the gauge in aligned relation to the die, and means to attach said holder to the machine, said machine and holder having cooperating tapered surfaces, and an adjusting screw mounted in the machine and effective to produce relative movement between said tapered surfaces whereby the holder may be adjusted relative to the machine.

29. An ornamenting machine for operating on shoe upper materials comprising a movable work support, a combined die and gauge unit, means to attach said unit fixedly in the machine, power means to reciprocate said support relative to the gauge and relative to said unit to a position where the work may, through cooperation with the gauge, be aligned with respect to the die, and thence back to its original position and a brake effective to bring said power means to rest as the support approaches its original position.

BENJAMIN W. FREEMAN.